Oct. 25, 1938.                    H. A. ROSE                    2,134,580
            SECTIONALIZING OF SECTIONAL TYPE RECTIFIERS
                   Filed Jan. 21, 1937        4 Sheets-Sheet 1

WITNESSES:
Wm. B. Sellers
S. A. Stricklett

INVENTOR
Herbert A. Rose.
BY
O. B. Buchanan
ATTORNEY

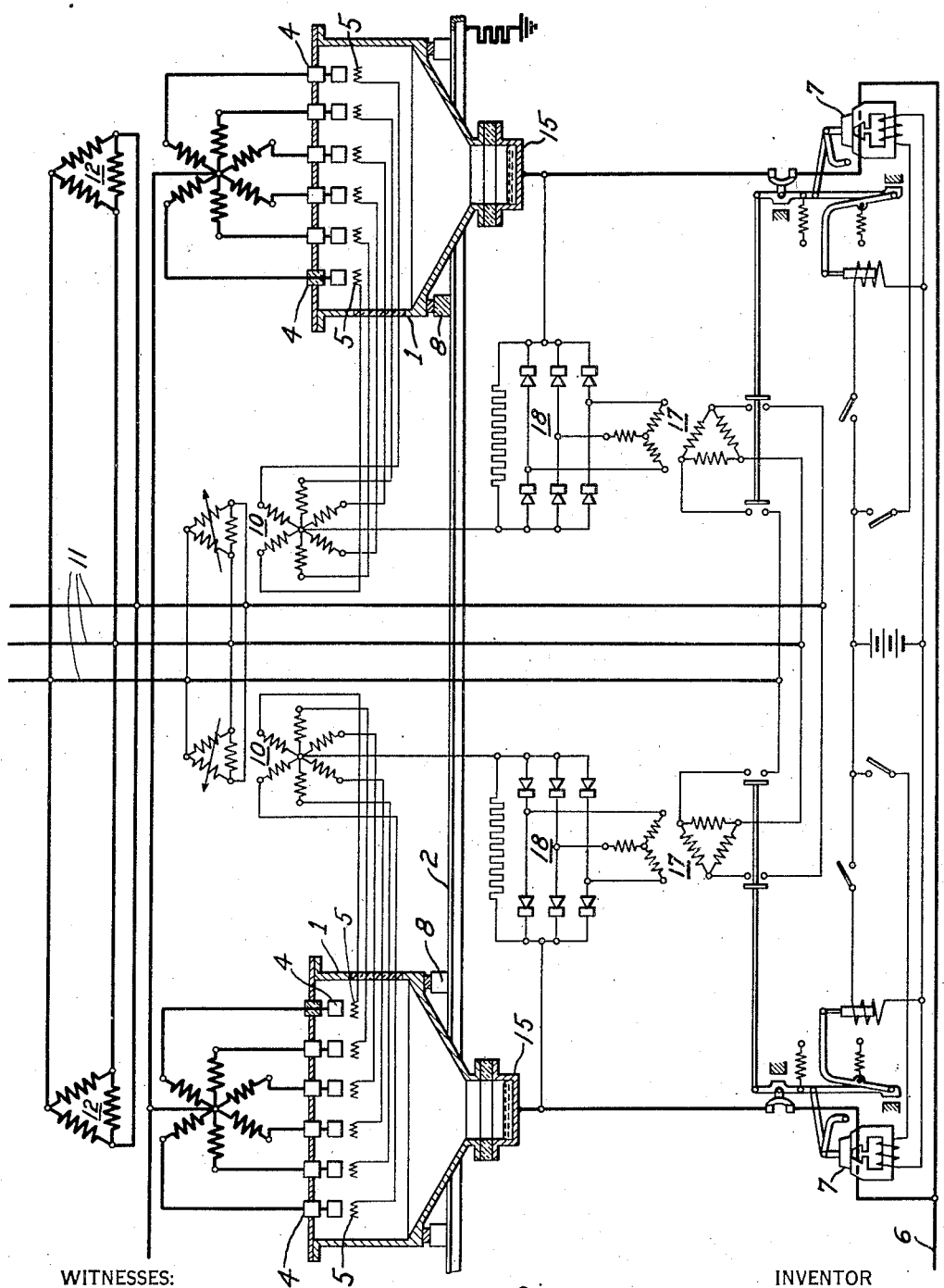

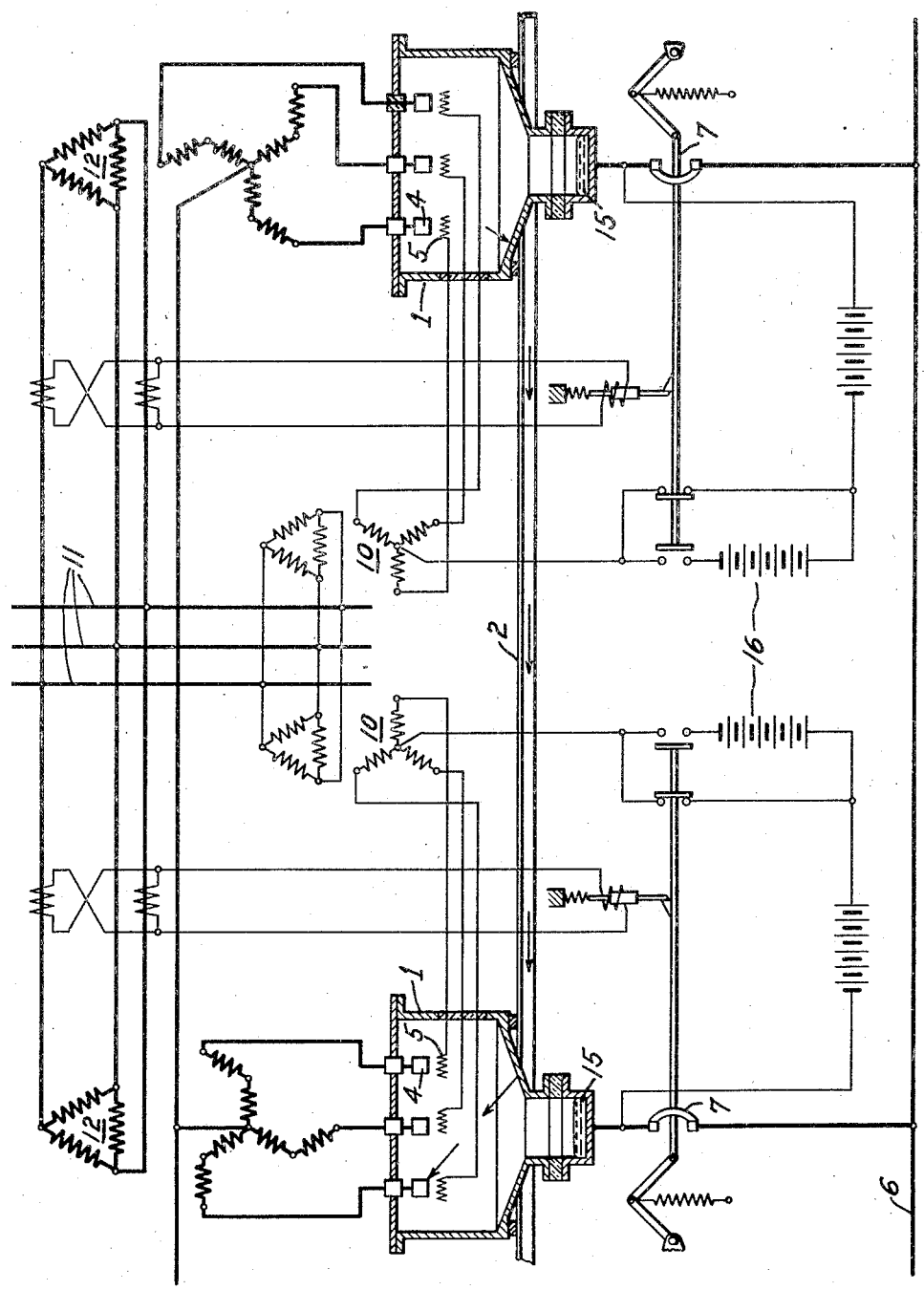

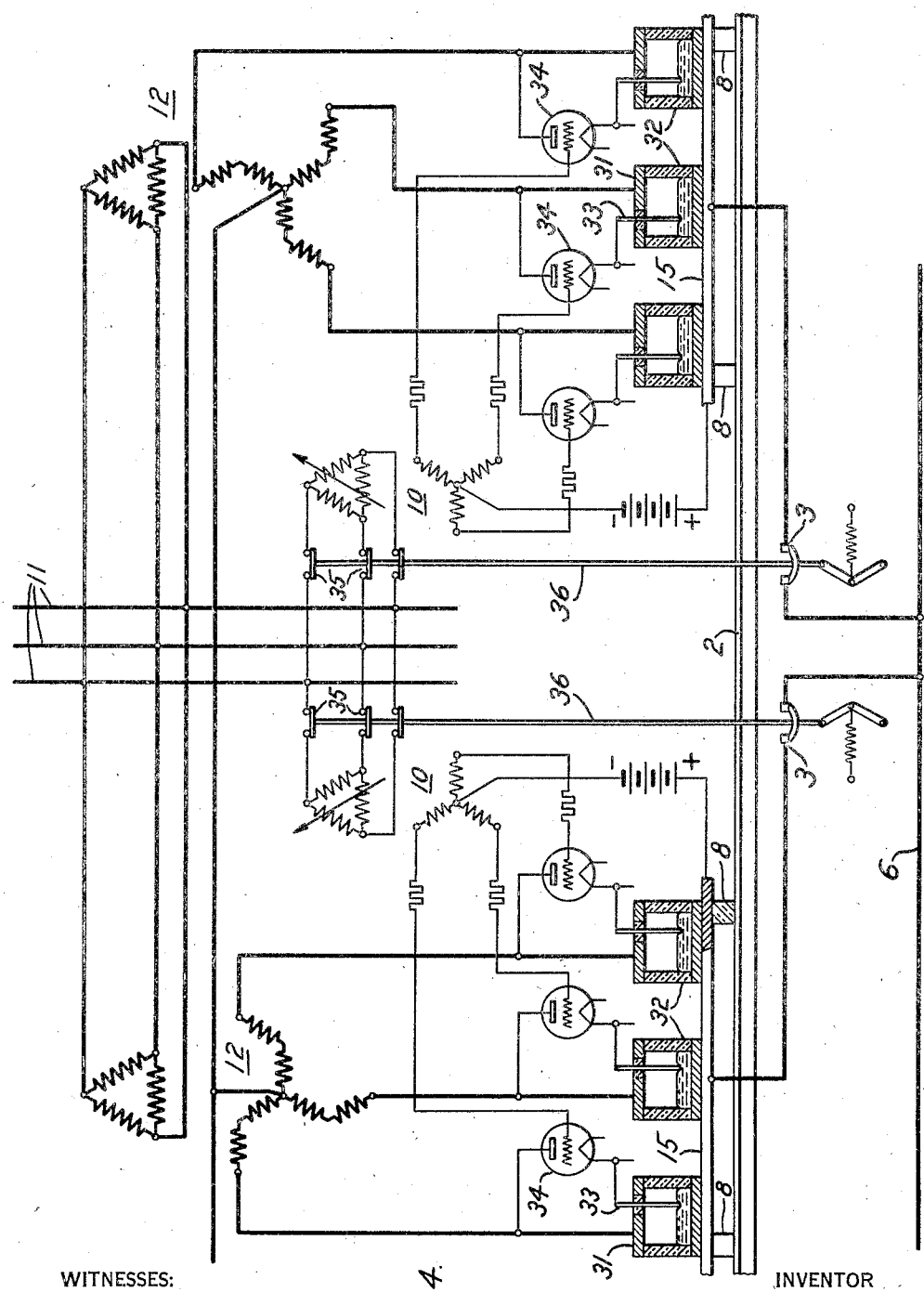

Patented Oct. 25, 1938

2,134,580

UNITED STATES PATENT OFFICE 2,134,580

SECTIONALIZING OF SECTIONAL TYPE RECTIFIERS

Herbert A. Rose, Pittsburgh, Pa., assignor to Westinghouse Electric & Manufacturing Company, East Pittsburgh, Pa., a corporation of Pennsylvania Application January 21, 1937, Serial No. 121,582

13 Claims. (Cl. 175—363)

My invention relates to a vapor electric device and particularly to a sectionalized mercury arc rectifier having means for interrupting arc-backs in the individual sections of the converter.

During operation, vapor electric converters are subject to random failures of commutation commonly known as arc-backs, a phenomena somewhat akin to flashover in rotating commutator devices. Upon the occurrence of an arc-back in an arc discharge device, the majority of the damage occurs because of the persistence of the inverse arc unduly heating or burning the anodes and their accompanying structure. Damage can be substantially reduced by the stopping of the inverse arc promptly after its conception.

Several means have been devised for accomplishing this, foremost among which is the use of circuit breakers to temporarily disconnect the converter and/or the application of blocking potential to suitable control electrodes associated with the indiviual arc paths.

In a sectionalized converter it is customary to mount the individual sections in a supporting frame so that the various rectifier sections are housed to operate as a unit.

The sectionalized type of converter is frequently applied to load systems where continuity of service is of prime importance. In applying the sectionalized converter to such loads it is customary to place a circuit breaker in series with each section of the converter. Under this system of operation when a fault, such as an arc-back occurs in any section, the corresponding series breaker is opened, which isolates the faulty section, leaving the healthy sections to carry the load until the fault is cleared and the section returned to service.

Sectionalized converters may be equipped with control grids or other control electrodes and by their use the fault clearing can be simply accomplished at much reduced cost. With control electrodes the series breaker of the faulty section is opened at the instant the fault occurs and blocking potential applied to the control electrodes of the isolated section. I have found however, that in sectionalized converters as heretofore constructed, that the arc to the faulty anode in the disconnected section is frequently not extinguished but persists. I have found that this is because of the fact that a high degree of ionization exists in all of the healthy sections because of the normal load current carried thereby. This ionization places the walls and frame of the supporting structure at arc potential and as a result a current flows from the arc space of the healthy sections through the supporting structure to the arc space of the faulty section and thence to the cathode spot on the defective anode. This is a direct current approximately proportional to the load current being carried by the healthy sections and although the anodes of the faulty section have been blocked by the voltage applied to the control electrodes no mechanism is present to interrupt the flow of direct current from the walls to the cathode spot on the defective anode.

According to my invention the difficulty may be overcome by providing insulation between the individual sections and the supporting structure. This breaks up the path of current flow through the supporting structure and permits proper operation of the control electrodes upon opening of the series breaker.

In some applications the sectionalized converter is applied without control grids and with only a single circuit breaker to connect the complete converter to the direct current bus. I have found that when an arc-back occurs in one section of such an installation there is sufficient current flow through the framework to burn wheel supports and tracks on which the section rests. This heavy current is caused by the above described ionization in the healthy tank or tanks and by inserting insulation, as described for the grid controlled section, the difficulty is removed.

Because of the ion current to the tank walls, converters as heretofore constructed were at arc potential and thus dangerous so that it was necessary to place a protective enclosure about the same. However when the sections are insulated according to my invention, the frame work may be grounded and serve as a protective enclosure for the tank thus decreasing the space requirements of the converter.

It is an object of my invention to provide a sectionalized rectifier so constructed that the individual sections are isolated from the supporting structure so that the inverse current both from the direct-current bus and through the frame from the adjacent sections can be eliminated, thus permitting the extinguishing of the arc to the faulty anode.

It is a further object to provide a sectionalized rectifier structure so that frame currents are eliminated to prevent damage to supporting structure.

It is a further object of my invention to provide a sectionalized grid controlled rectifier whereby individual sections may be removed from service upon the occurrence of arc back in any one section without the necessity of discontinuing service to the load.

It is a further object of my invention to accomplish the aforesaid advantage with maximum simplicity and minimum cost.

Other objects and advantages will be apparent from the following detailed description taken in conjunction with the accompanying drawings, in which:

Fig. 2 is a schematic illustration of a converter according to my invention;

Fig. 3 is a schematic illustration similar to that of Fig. 2, but showing the source of inverse current when the insulators, according to my invention, are omitted;

Fig. 4 is a modification similar to Fig. 2, showing a modified type of converter section; and, Fig. 5 is a fragmentary sectional elevation showing the details of application of my insulators.

Figure 1:
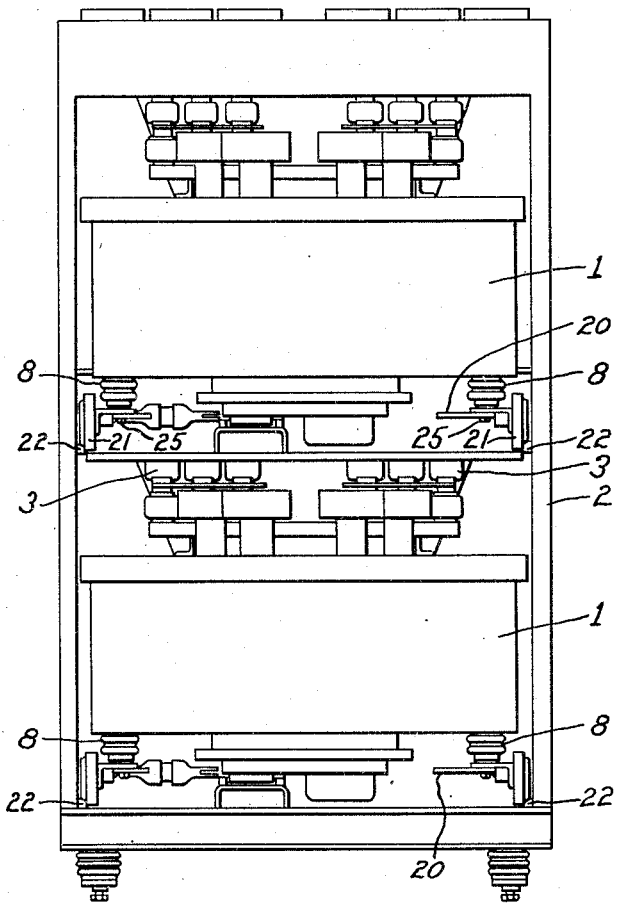
Figure 1 is an elevational view of a converter according to my invention.

A converter, according to my invention, comprises a plurality of parallel connected converter sections 1 housed in a suitable frame structure 2 which supports the connections 3 to the various operating and control electrodes 4 and 5, suitable insulators 8 are provided between the sections 1 and the supporting structure 2, and preferably being so arranged that the individual converter sections 1 may be readily removed for inspection or maintenance. Each of the converter sections 1 is provided with a plurality of arc paths or valves 4, each of which is preferably provided with a control electrode, illustrated as a grid 5. Each section 1 is connected to the direct-current bus 6 through a suitable circuit breaker 3 responsive to the arc-back or other fault current to disconnect the faulty section 1 from the bus 6. Each section 1 of the converter is preferably provided with an individual control device, such as an impulsing transformer 10, supplied with current from any suitable source, such as the alternating-current circuit 11 supplying the main rectifier transformer 12. In series between the cathode 15 of the section 1 and the neutral in the control transformer 10 is connected a suitable biasing potential which may be either a suitable source of direct current, such as a battery 16, or a transformer 17 connected by means of a suitable rectifying device 18.

While any suitable fault responsive means may be used to apply the biasing potential, I prefer to so connect the biasing potential that it is controlled by means of the direct-current breaker 7 so that upon the opening of the direct-current breaker 7 the biasing potential is altered to block operation of the associated section of the converter. Since the opening of the direct-current breaker 7 prevents inverse current flow from the direct-current bus 6 through the faulty valve 4 and the isolating insulator 8 prevents current flow through the supporting structure 2 from the parallel tanks, the changing of the biasing potential from an operating to a blocking potential will permit the grids 5 to block so that no current flows to the faulty valve 4 and consequently the inverse current is eliminated. Any suitable means (not shown) may be utilized for restoring the blocked section to service either immediately after the cessation of the inverse arc or after a predetermined time interval.

In Fig. 3 is illustrated the source of frame current with the heretofore known construction, the structure and connections being simplified for the sake of clearness. Assuming that one anode 4 in the left hand section 1 developes a cathode and an arc back occurs, the breaker 7 associated therewith will open disconnecting the bus 6 and applying blocking potential from the battery 16 to the grids 5. However, the positive ions in the right hand section 1 will carry a space current to the walls from where it flows as indicated by the arrows through the frame 2 to the faulty anode thus maintaining the cathode spot and preventing clearing of the fault.

In the modification according to Fig. 4, the multi-anode tank 1 has been replaced by a group of make-alive type valves 31, each valve 31 having a distinct arc space such as the container 32. Each of the valves 31 is provided with a make-alive control electrode 33 and the control transformer 10 controls the supply of current to the electrode 33 by means of a suitable valve 34. The make-alive electrodes are therefore easily made inoperative by a suitable circuit breaker 35 in the supply circuit of transformer 10 controlled by a suitable interlock 36 on the section breaker 3.

Figure 5:
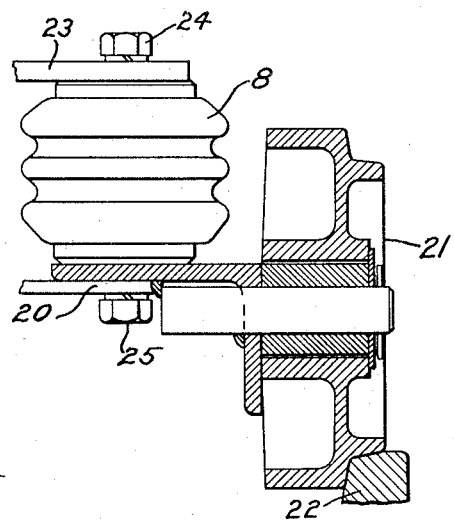

In Fig. 5 is a detail of the method of applying the insulators 8. Each of the sections is provided with a carriage 20 having wheels 21 engaging tracks 22 in the frame 2 so that the sections may be readily rolled out of the frame to permit inspection or repair. The insulators 8 are inserted between the carriage 20 and a base plate 23 carried by the section and secured to both by suitable screws 24 and 25.

While for purposes of illustration I have disclosed specific embodiments of my invention, it is apparent that many changes and modifications may be made therein without departing from the spirit and scope of the appended claims.

I claim as my invention:

1. A vapor arc converter system comprising a housing structure, a plurality of multi-valve converter sections supported in insulated relation in said housing, a grid-control circuit for each section of said converter, means responsive to abnormal current conditions in any section of said converter for isolating said section and applying a biasing potential to the grid-control circuit thereof.

2. A protective system for a sectionalized vapor electric converter comprising a structure for supporting said converter, a circuit breaker device in series with each of the sections of said converter, control electrodes for each valve of said converter, insulators for supporting each section of said converter in insulated relation with respect to said supporting structure, and means responsive to abnormal current conditions in a section for applying blocking potential to the control electrodes in said section.

3. In an electric current conversion system having a converter composed of a plurality of substantially identical sections and a metallic framework supporting said sections, a protective system comprising control electrodes for each of said sections, circuit breaker devices for connecting the sections to the load circuit, means responsive to abnormal current conditions in any of said converter sections for disconnecting said converter section from the circuit and applying blocking potential to the control electrodes of the disconnected section, and insulating means for rendering the blocking potential effective to interrupt all of the current in said section.

4. An electrical conversion system comprising a converter composed of a plurality of parallel connected valve groups, a common supporting structure for said valve groups, a control electrode for each valve of the converter, separate grid supply means for each group of valves, a disconnect means for each group of valves, means responsive to abnormal current conditions in a group of valves for applying blocking potential to the grids of that group of valves and insulator means for preventing current flow through the supporting structure from the remaining valve groups.

5. An electric current conversion system comprising a plurality of similar sections, a plurality of arc-paths in each section, control means for each of said arc-paths, a metallic framework supporting all of said sections and insulator means for separating each of said sections from said framework.

6. An electric-current converting system comprising a converter consisting of a plurality of substantially identical converter sections, each of said sections having a plurality of arc-paths, an electrically conductive frame structure supporting said converter, circuit interrupter means for each section of said converter, means responsive to an abnormal current condition in any section for operating the circuit interrupting means associated therewith and insulating means for inhibiting circulating currents between said sections.

7. An electric current conversion system comprising a plurality of substantially similar converter sections, each section having a plurality of successively energized arc-paths, an electrically conductive housing structure supporting all of said sections, circuit breaker means for disconnecting each of said sections and insulator means for isolating each of said sections from said housing structure.

8. An electrical conversion system comprising a converter consisting of a plurality of parallel connected valve groups, an electrically conducting supporting structure for all of said valve groups, disconnecting means for each of said valve groups, means responsive to abnormal current conditions in any valve group for disconnecting that valve group and means for inhibiting currents from flowing into a disconnected valve group through the supporting structure from the remaining valve groups.

9. A sectionalized vapor-electric device comprising a plurality of sections, each of said sections including a plurality of electric valves, a grounded frame for housing said sections, insulating means between said frame and each of said sections, control means for causing said valves to be conductive during at least a portion of the positive voltage cycle applied thereto and means responsive to fault in any section to make said control means inoperative for the faulty section.

10. A sectionalized rectifier comprising a plurality of substantially similiar sections, a conducting housing structure for said sections, means for insulating each of said sections from said housing structure, and means for grounding said housing structure.

11. A sectionalized rectifier comprising a plurality of substantially similar sections, a housing structure for said sections, means for insulating said sections from said housing structure, and means including a resistance means for grounding said housing structure.

12. A sectionalized rectifier comprising a plurality of substantially similar rectifier sections, a conducting frame supporting said sections, insulating means between each of said sections and said frame, each of said sections containing a plurality of electronic valves.

13. A sectionalized converter comprising a plurality of sections, each of said sections including a plurality of electronic valves, a frame structure supporting all of said sections, insulating means between each of said sections and said frame, control means for each section of said converter for initiating current flow in said electronic valves and means responsive to fault conditions in any one of said sections to render the control means for said section inoperative.

HERBERT A. ROSE.